(12) United States Patent
Mickens

(10) Patent No.: US 9,250,940 B2
(45) Date of Patent: Feb. 2, 2016

(54) VIRTUALIZATION DETECTION

(71) Applicant: Microsoft Technology Licensing, LLC, Redmond, WA (US)

(72) Inventor: James W. Mickens, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 380 days.

(21) Appl. No.: 13/725,882

(22) Filed: Dec. 21, 2012

(65) Prior Publication Data

US 2014/0181819 A1 Jun. 26, 2014

(51) Int. Cl.
*G06F 9/455* (2006.01)
*G06F 21/53* (2013.01)
*G06F 21/74* (2013.01)

(52) U.S. Cl.
CPC ............ *G06F 9/45529* (2013.01); *G06F 21/53* (2013.01); *G06F 21/74* (2013.01)

(58) Field of Classification Search
None
See application file for complete search history.

(56) References Cited

U.S. PATENT DOCUMENTS

| | | | |
|---|---|---|---|
| 2004/0225999 A1* | 11/2004 | Nuss | 717/114 |
| 2006/0075494 A1 | 4/2006 | Bertman et al. | |
| 2007/0016948 A1 | 1/2007 | Dubrovsky et al. | |
| 2007/0016949 A1* | 1/2007 | Dunagan et al. | 726/22 |
| 2008/0301811 A1* | 12/2008 | Jung | 726/23 |
| 2009/0249053 A1 | 10/2009 | Zimmer et al. | |
| 2010/0015584 A1* | 1/2010 | Singer et al. | 434/236 |
| 2010/0153862 A1 | 6/2010 | Schreiber | |
| 2011/0077973 A1* | 3/2011 | Breitenstein et al. | 705/3 |
| 2011/0197177 A1* | 8/2011 | Mony | 717/115 |
| 2012/0258777 A1 | 10/2012 | Huang | |
| 2013/0019149 A1* | 1/2013 | Spencer et al. | 715/202 |
| 2014/0046722 A1* | 2/2014 | Rosenbloom et al. | 705/7.28 |

FOREIGN PATENT DOCUMENTS

WO 2012/027669 A1 3/2012
WO 2014/100785 6/2014

OTHER PUBLICATIONS

"Web Check-Browser Virtualization", Retrieved at <<http://www.checkpoint.com/products/webcheck/DS_WebCheck_120614.pdf>>, Retrieved Date Nov. 21, 2012, pp. 2.
"Using XamlReader.Load", Retrieved at <<http://msdn.microsoft.com/en-us/library/cc189076(v=vs.95).aspx>>, Retrieved Date Nov. 21, 2012, pp. 6.

(Continued)

*Primary Examiner* — Tuan Dao
(74) *Attorney, Agent, or Firm* — Alin Corie; Sandy Swain; Micky Minhas

(57) ABSTRACT

A baseline set of graph information associated with a predefined execution environment of a program may be obtained, the baseline set associated with a baseline time interval. The predefined execution environment includes predefined environment objects, at least a portion of which are dynamically mutatable. A second set of graph information associated with the predefined execution environment may be obtained, the second set associated with a second time interval that is later in time than the baseline time interval. The baseline set and the second set may be compared to detect virtualization activity associated with a dynamic runtime.

20 Claims, 11 Drawing Sheets

(56) References Cited

OTHER PUBLICATIONS

Figure 1:
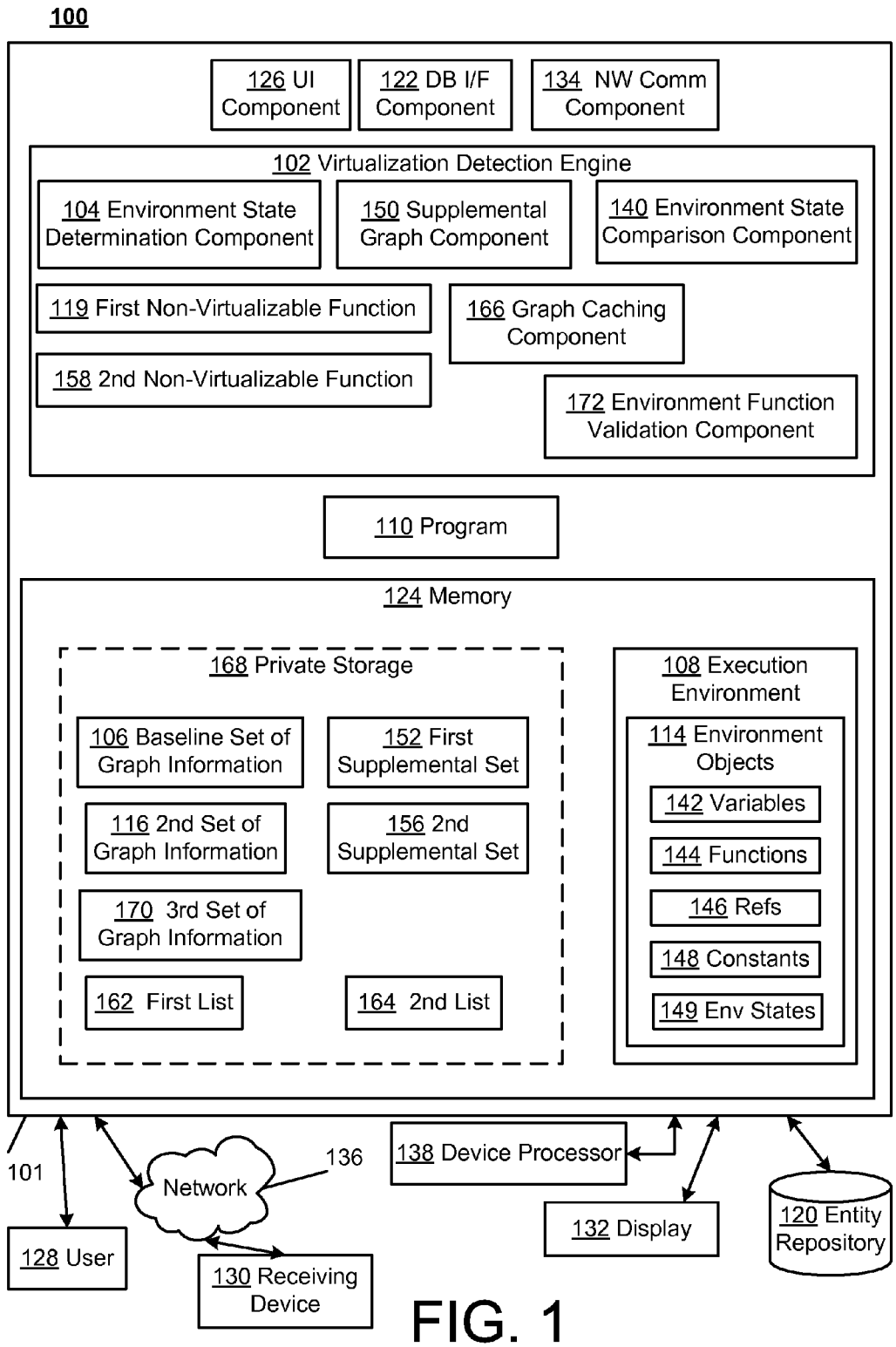

Greene, et al., "Intel Trusted Execution Technology", Retrieved at <<http://www.intel.com/technology/security/downloads/arch-overview.pdf>>, Intel White Paper, Retrieved Date Nov. 21, 2012, pp. 8.

Branco, Rodrigo., "A Scientific (But Non Academic) Study of How Malware Employs Anti-Debugging, Anti-Disassembly and Anti-Virtualization Technologies", Retrieved Nov. 21, 2012 at <<https://www.blackhat.com/html/bh-us-12/bh-us-12-briefings.html#Branco>>, Jul. 26, 2012, pp. 30.

Al.Hajeri, Amal., "DNS Spoofing Attack", Retrieved at <<http://www.giac.org/paper/gcih/364/dns-spoofing-attack/103863>>, Retrieved Date Nov. 21, 2012, pp. 36.

Austin, et al., "Narcissus", Retrieved at <<https://github.com/mozilla/narcissus/>> Retrieved Date Nov. 22, 2012, pp. 5.

Canali, et al., "Prophiler: A Fast Filter for the Large-Scale Detection of Malicious Web Pages", Retrieved Nov. 21, 2012 at <<http://www.cs.ucsb.edu/~vigna/publications/2011_canali_cova_kruegel_vigna_Prophiler.pdf>>, Proceedings of the 20th International Conference on World Wide Web (WWW 2011), Mar. 28, 2011, pp. 10.

Dagon, et al., "Corrupted DNS Resolution Paths: The Rise of a Malicious Resolution Authority", Retrieved Nov. 21, 2012 at <<http://www.citi.umich.edu/u/provos/papers/ndss08_dns.pdf>>, Proceedings of the Network and Distributed System Security Symposium (NDSS), Feb. 10, 2008, pp. 15.

Eckersley, Peter., "How Unique Is Your Web Browser?", Proceedings of the 10th International Conference on Privacy Enhancing Technologies (PETS'10), Jul. 2010, pp. 19.

Ferrie, Peter., "Attacks on Virtual Machine Emulators", Retrieved Nov. 21, 2012 at <<http://www.symantec.com/avcenter/reference/Virtual_Machine_Threats.pdf>>, Proceeding of the 9th Annual Conference of the Association of Anti Virus Asia Researchers, Dec. 2006, pp. 13.

Flanagan, David., "JavaScript—The Definitive Guide, 5th Edition", Retrieved Nov. 21, 2012 at <<http://www.studentcubes.com/data/books/0/JavaScript%20The%20Definite%20Guide.pdf>>, O'Reilly Media, Aug. 2006, pp. 1204.

"eCommerce Web Site Performance Today : An Updated Look At Consumer Reaction to a Poor Online Shopping Experience", Retrieved Nov. 21, 2012 at <<http://www.damcogroup.com/white-papers/ecommerce_website_perf_wp.pdf>>, Technical Report, Forrester Research, Aug. 17, 2009, pp. 21.

"Jsonrpcjs", Retrieved Nov. 22, 2012 at <<https://github.com/gimmi/jsonrpcjs>>, pp. 5.

"Getting Started with the API", Retrieved Nov. 22, 2012 <<https://developers.google.com/caja/docs/gettingstarted/>>, pp. 5.

Heiderich, et al., "IceShield: Detection and Mitigation of Malicious Websites with a Frozen DOM", Retrieved Nov. 21, 2012 at <<http://www.nds.rub.de/media/emma/veroeffentlichungen/2011/06/21/iceshield-raid11.pdf>>, 14th International Symposium of Recent Advances in Intrusion Detection, Sep. 20, 2011, pp. 20.

Mickens, James., "Rivet: Browser-Agnostic Remote Debugging for Web Applications", Retrieved Nov. 21, 2012 at <<http://research.microsoft.com/pubs/161835/rivet.pdf>>, Proceedings of the USENIX Conference on Annual Technical Conference, Jun. 2012, pp. 13.

Jakobsson, et al., "What Instills Trust? A Qualitative Study of Phishing", Retrieved Nov. 21, 2012 at <<http://koasas.kaist.ac.kr/bitstream/10203/5313/1/jakobsson.pdf>>, Proceedings of the 11th International Conference on Financial Cryptography and 1st International Conference on Usable Security, Feb. 16, 2007, pp. 6.

"Javascript Obfuscator, Compressor, and Minifier", Retrieved at <<http://www.javascript-source.com/>>, Retrieved Date Nov. 21, 2012, pp. 2.

Darryl., "Revelo—Javascript Deobfuscator", Retrieved Nov. 21, 2012 at <<http://www.kahusecurity.com/2012/revelo-javascript-deobfuscator/>>, May 1, 2012, pp. 14.

Kaplan, et al., "NOFUS: Automatically Detecting" +StringfromCharCode(32)+"ObFuSCateD" toLowerCase( )+"JavaScript Code", Retrieved Nov. 21, 2012 at <<http://research.microsoft.com/pubs/148514/tr.pdf>>, Microsoft Research Technical Report—2011-57, May 5, 2011, pp. 11.

Vikram, et al., "Ripley: Automatically Securing Web 20 Applications Through Replicated Execution", Retrieved Nov. 21, 2012 at <<http://research.microsoft.com/pubs/101931/ccs09.pdf>>, Proceedings of the 16th ACM Conference on Computer and Communications Security (CCS'09), Nov. 9, 2009, pp. 14.

Lielmanis, Einar., "JS Beautifier", Retrieved at <<https://github.com/einars/js-beautify>>, Retrieved Date Nov. 22, 2012, pp. 6.

Mickens, et al., "Atlantis: Robust, Extensible Execution Environments for Web Applications", Retrieved Nov. 21, 2012 at <<http://research.microsoft.com/pubs/154698/atlantis-sosp.pdf>>, Proceedings of the Twenty-Third ACM Symposium on Operating Systems Principles (SOSP '11), Oct. 23, 2011, pp. 217-231.

Mickens, et al., "Mugshot: Deterministic Capture and Replay for JavaScript Applications", Retrieved Nov. 21, 2012 at <<http://research.microsoft.com/pubs/120937/mugshot.pdf>>, Proceedings of the 7th USENIX Conference on Networked Systems Design and Implementation (NSDI'10), Apr. 2010, pp. 15.

Miller, et al., "Caja Safe Active Content in Sanitized Javascript", Retrieved Nov. 21, 2012 at <<http://google-caja.googlecode.com/files/caja-spec-2008-06-07.pdf>>, Jun. 7, 2008, pp. 30.

Mowery, et al., "Fingerprinting Information in JavaScript Implementations", Retrieved Nov. 21, 2012 at <<http://w2spconf.com/2011/papers/jspriv.pdf>>, Proceedings of the Web 2.0 Security and Privacy (W2SP 2011), IEEE Computer Society, May 2011, pp. 11.

"Object.defineProperty," Retrieved at <<https://developer.mozilla.org/en-US/docs/JavaScript/Reference/Global_Objects/Object/defineProperty>>, JavaScript Reference—defineProperty, Retrieved Date Nov. 21, 2012, pp. 8.

"Browser Detection and Cross Browser Support", Retrieved at <<https://developer.mozilla.org/en-US/docs/Browser_Detection_and_Cross_Browser_Support>> Retrieved Date Nov. 21, 2012, pp. 20.

Ormandy, Tavis., "An Empirical Study into the Security Exposure to Hosts of Hostile Virtualized Environments", Retrieved Nov. 21, 2012 at <<http://taviso.decsystem.org/virtsec.pdf>>, Jan. 2007, pp. 10.

Phung, et al., "Lightweight Self-Protecting JavaScript", Retrieved Nov. 21, 2012 at <<http://www.cse.chalmers.se/~dave/papers/ASIACCS09.pdf>>, Proceedings of the 4th International Symposium on Information, Computer, and Communications Security (ASIACCS '09), Mar. 10, 2009, pp. 14.

Reis, et al., "Detecting In-Flight Page Changes with Web Tripwires", Retrieved Nov. 21, 2012 at <<http://www.cs.washington.edu/research/security/web-tripwire/nsdi-2008.pdf>>, Proceedings of the 5th USENIX Symposium on Networked Systems Design and Implementation, Apr. 16, 2008, pp. 14.

Rydstedt, et al., "Busting Frame Busting: A Study of Clickjacking Vulnerabilities on Popular Sites", Retrieved Nov. 21, 2012 at <<http://crypto.stanford.edu/~dabo/pubs/papers/framebust.pdf>>, Proceedings of IEEE Web 2.0 Security and Privacy (W2SP 2010), May 2010, pp. 9.

Schechter, et al., "The Emperor's New Security Indicators an Evaluation of Website Authentication and the Effect of Role Playing on Usability Studies", Retrieved Nov. 21, 2012 at <<http://ieeexplore.ieee.org/stamp/stamp.jsp?tp=&arnumber=4223213>>, Proceedings of the IEEE Symposium on Security and Privacy (SP'07), May 20, 2007, pp. 15.

Curtsinger, et al., "Zozzle: Low-overhead Mostly Static JavaScript Malware Detection", Retrieved Nov. 21, 2012 at <<http://research.microsoft.com/pubs/152618/usenixsec11b.pdf>>, Microsoft Research Technical Report—2010-156, Nov. 27, 2010, pp. 18.

Liston, et al., "On the Cutting Edge: Thwarting Virtual Machine Detection", Retrieved Nov. 21, 2012 at <<http://handlers.sans.org/tliston/ThwartingVMDetection_Liston_Skoudis.pdf>>, Jul. 2006, pp. 27.

"jterrace/jsjsL", Retrieved Nov. 21, 2012 at <<https://github.com/jterrace/js.js>>, pp. 6.

Vallentin, et al., "Quantifying Persistent Browser Cache Poisoning", Retrieved Nov. 21, 2012 at <<http://matthias.vallentin.net/coursework/cs294-50-s10.pdf>>, in CS 294-50: Advanced Topics in Computer Security. UC Berkeley, Spring 2010, pp. 11.

(56) References Cited

OTHER PUBLICATIONS

"PidCrypt—Pidder's JavaScript Crypto Library", Retrieved Nov. 21, 2012 at <<https://www.pidder.com/pidcrypt/>>, 2009, pp. 3.
Weinberger, et al., "A Systematic Analysis of XSS Sanitization in Web Application Frameworks", Retrieved Nov. 21, 2012 at <<http://www.cs.berkeley.edu/~dawnsong/papers/2011%20systematic%20analysis%20xss>>, In Proceedings of the 16th European Conference on Research in Computer Security (ESORICS'11), Sep. 12-14, 2011, pp. 20.
"W3C Document Object Model (DOM)", Retrieved Nov. 21, 2012 at <<http://www.w3.org/DOM/>>, World Wide Web Consortium, 2005, pp. 3.
"Access Control for Cross-Site Requests", Retrieved Nov. 21, 2012 at <<http://www.w3.org/TR/2008/WD-access-control-20080912/>>, World Wide Web Consortium, W3C Working Draft, Sep. 12, 2008, pp. 14.
Choi, et al., "Automatic Detection for JavaScript Obfuscation Attacks in Web Pages through String Pattern Analysis," Retrieved Dec. 19, 2012 at <<http://www.sersc.org/journals/IJSIA/vol4_no2_2010/2.pdf>>, International Journal of Security and Its Applications, vol. 4, No. 2, Apr. 2010, pp. 13-25.
Taute, Sven, "Circumventing Signature-Based Detection of Javascript Exploits with Forced Timeouts," Retrieved Dec. 19, 2012 at <<http://magazine.hitb.org/issues/HITB-Ezine-Issue-003.pdf>>, Hack in the Box Magazine, vol. 1, Issue 3, Jul. 2010, pp. 42-47.
"Second Written Opinion Received for PCT Patent Application No. PCT/US2013/077344", Mailed Date: Dec. 18, 2014, 6 Pages.
Applicant response to "Second Written Opinion Received for PCT Patent Application No. PCT/US2013/077344", Mailed Date: Dec. 18, 2014, response filed Feb. 18, 2015, 11 Pages.
"International Search Report & Written Opinion for PCT Application No. PCT/US2013/077344", Mailed Date: May 27, 2014, Filed Date: Dec. 21, 2013, 11 Pages.
Adida, et al., "Rootkits for JavaScript Environments", In 3rd USENIX Workshop on Offensive Technologies, Aug. 10, 2009, 7 Pages.
Gadaleta, et al., "Hello rootKitty: A Lightweight Invariance-Enforcing Framework", In Proceedings of the 14th International Conference on Information Security, Oct. 26, 2011, pp. 213-228.
"International Preliminary Report on Patentability" for PCT Patent Application No. PCT/US2013/077344, Mailed Date: Apr. 10, 2015, 16 Pages.

\* cited by examiner

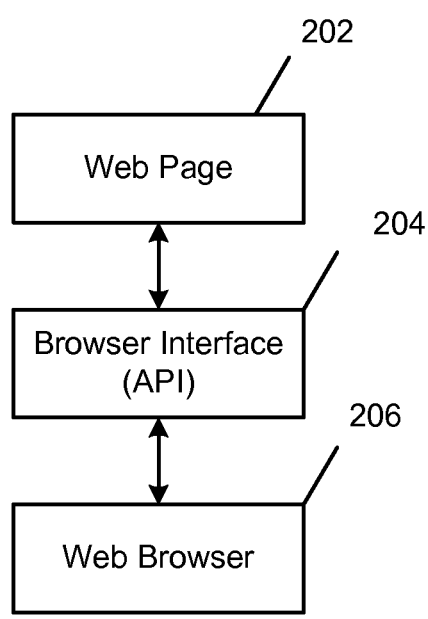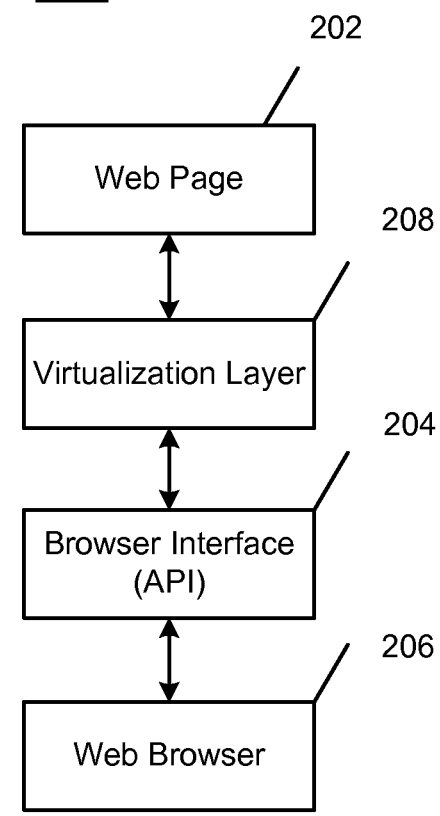
FIG. 2a
FIG. 2b

300b

312 — The baseline set of graph information includes baseline state information associated with the predefined execution environment objects and relationships between the predefined execution environment objects, at the baseline time interval, wherein a graph associated with the baseline set of graph information is induced based on graph nodes representing the predefined execution environment objects and graph edges representing the relationships between the predefined execution environment objects 314 — The second set of graph information includes second state information associated with the predefined execution environment objects and the relationships between the predefined execution environment objects, at the second time interval

316 — Obtain the baseline set of graph information based on recursively first traversing nodes representing predefined execution environment objects that are reachable via references from global variables in the predefined execution environment, at the baseline time interval, and storing values associated with first traversal visited nodes in a first list 318 — Obtain the second set of graph information based on recursively second traversing the nodes representing the predefined execution environment objects that are reachable via references from global variables in the predefined execution environment, at the second time interval, and storing values associated with second traversal visited nodes in a second list 320 — Compare the baseline set and the second set based on one or more of comparing a size of the first list with a size of the second list, or comparing a value of each element of the first list to a value of a corresponding element of the second list

FIG. 3b

VIRTUALIZATION DETECTION

BACKGROUND

Developers and users of applications such as web applications may rely on execution environments to ensure that their applications execute in accordance with user expectations. Dynamic execution environments such as JAVASCRIPT execution environments may define reflection interfaces that allow applications to dynamically introspect and modify core system objects. However, this may lead to virtualization events, in which, for example, a virtualizing enclosing environment may present an application with an ostensibly unmodified execution environment (e.g., a JAVASCRIPT runtime); however, the execution environment may have been modified by the virtualizing enclosing environment, which may cause the application to experience unexpected results (or to potentially experience undesirable interference from the virtualizing enclosing environment).

SUMMARY

According to one general aspect, a system may include a device that includes at least one processor. The device may include a virtualization detection engine that includes instructions tangibly embodied on a computer readable storage medium for execution by the processor. The virtualization detection engine may include an environment state determination component configured to obtain a baseline set of graph information associated with a predefined execution environment of a program. The baseline set may be associated with a baseline time interval, and the predefined execution environment may include predefined environment objects, at least a portion of which may be dynamically mutatable. The environment state determination component may obtain a second set of graph information associated with the predefined execution environment, the second set associated with a second time interval that is later in time than the baseline time interval. An environment state comparison component may be configured to compare the baseline set and the second set to detect virtualization activity associated with a dynamic runtime.

According to another aspect, a baseline set of graph information associated with a predefined JAVASCRIPT execution environment of a web browser may be obtained, the baseline set indicating a baseline state of the predefined JAVASCRIPT execution environment at a baseline time interval. A second set of graph information associated with the predefined JAVASCRIPT execution environment may be obtained, the second set indicating a second state of the predefined JAVASCRIPT execution environment at a second time interval that is later in time than the baseline time interval. The baseline set and the second set may be compared to detect virtualization activity associated with a dynamic runtime.

According to another aspect, a computer program product tangibly embodied on a computer-readable storage medium may include executable code that may cause at least one data processing apparatus to obtain, via a device processor, a baseline set of state information associated with predefined execution environment objects that are included in a predefined execution environment of a program, at least a portion of the predefined execution environment objects being dynamically mutatable, the baseline set of state information indicating a baseline state of the predefined execution environment at a baseline time interval. Further, the data processing apparatus may obtain a second set of state information associated with the predefined execution environment objects, the second set of state information indicating a second state of the predefined execution environment at a second time interval that is later in time than the baseline time interval. Further, the data processing apparatus may initiate a comparison of the baseline set of state information and the second set of state information to determine virtualization activity associated with a dynamic runtime.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIG. 1 is a block diagram illustrating of an example system for detecting virtualization in dynamic runtime environments.

FIGS. 2*a*-2*b* are block diagrams of example applications and execution environments.

FIGS. 3*a*-3*e* are a flowchart illustrating example operations of the system of FIG. 1.

Figure 4A:
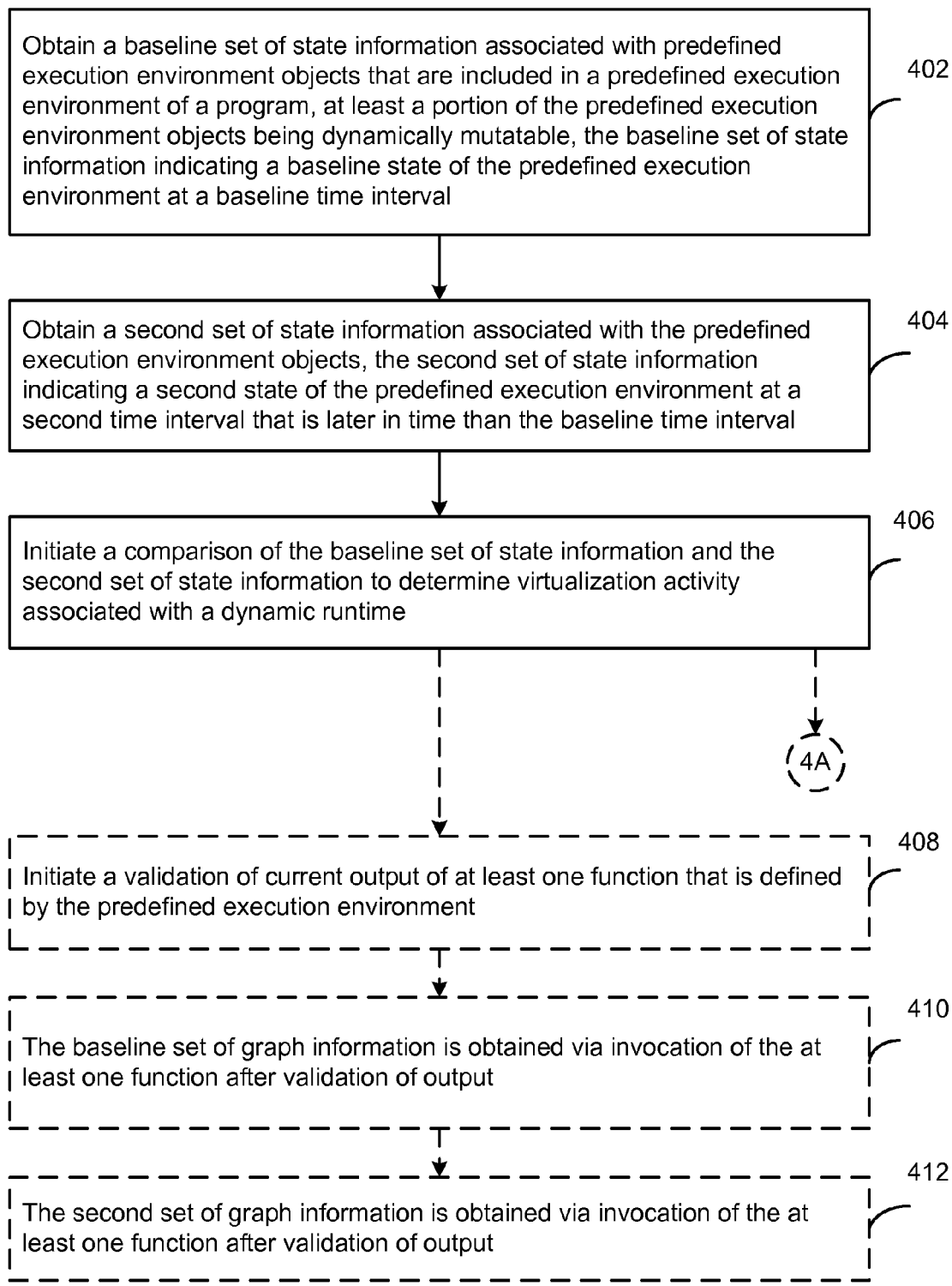
Figure 4B:
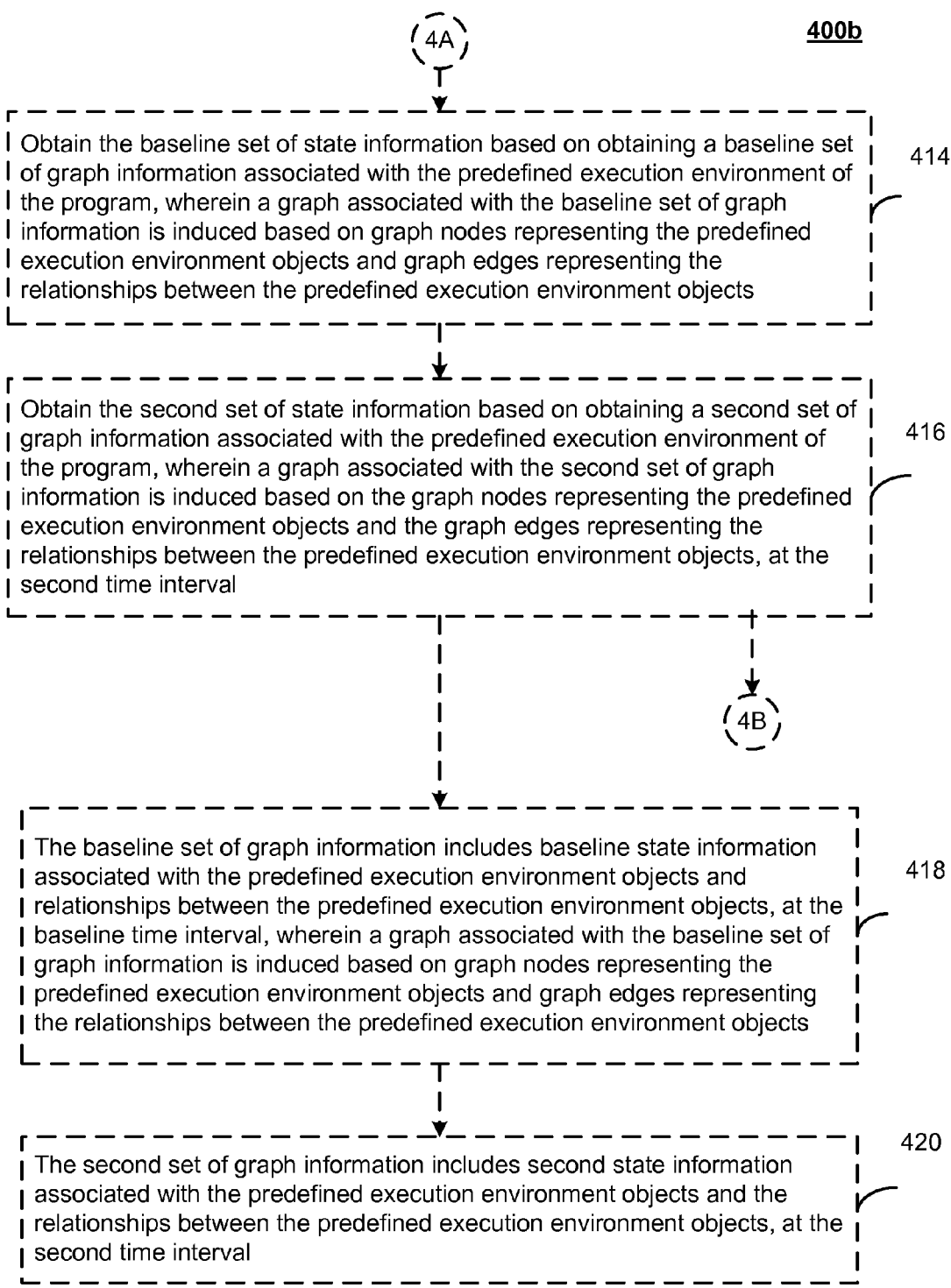
Figure 4C:
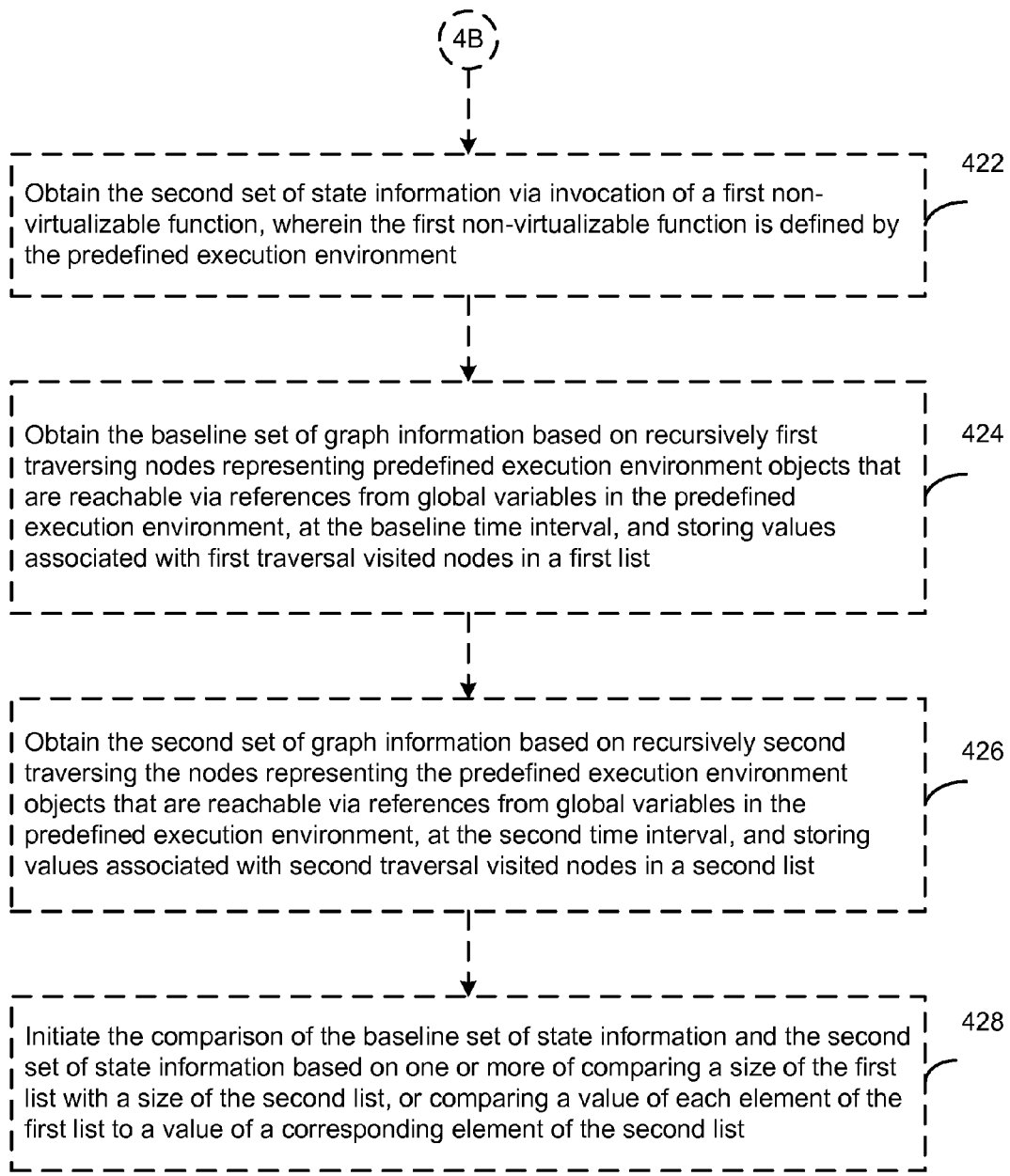

FIGS. 4*a*-4*c* are a flowchart illustrating example operations of the system of FIG. 1.

Figure 5:
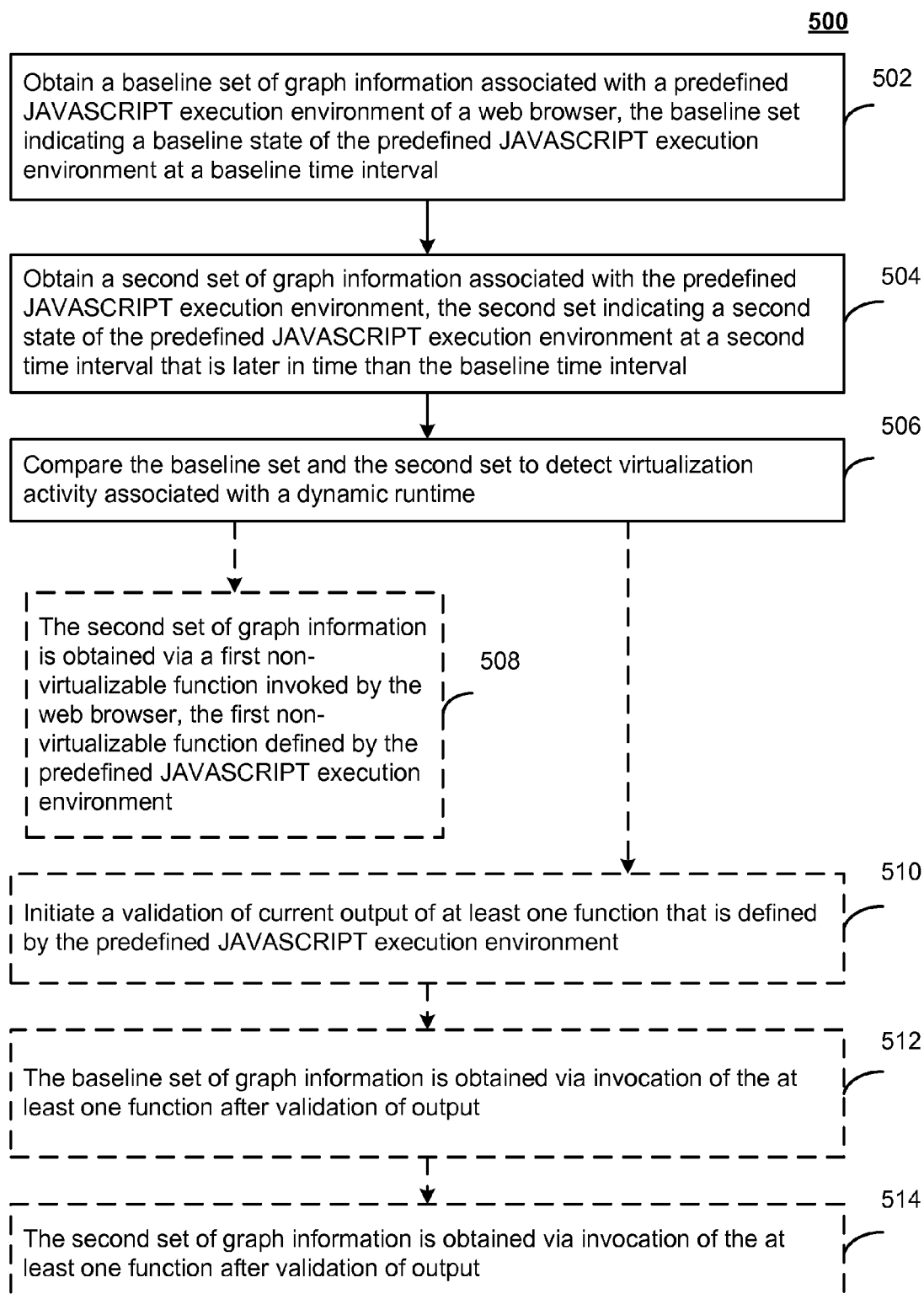

FIG. 5 is a flowchart illustrating example operations of the system of FIG. 1.

DETAILED DESCRIPTION

I. Introduction

Execution environments are used by applications such as web applications as a basis for expected execution performance by users of the applications. For example, a JAVASCRIPT runtime has been widely used as an execution substrate for web applications. This runtime may define reflection interfaces that allow applications to dynamically introspect and modify core system objects. However, the runtime may provide no way for a JAVASCRIPT library to definitively access the native, unmodified versions of core runtime objects. Thus, a naive web application may be vulnerable to virtualization attacks, if a malicious enclosing environment (e.g., a page) presents the application with an ostensibly unmodified JAVASCRIPT runtime. However, the runtime may have actually been specially crafted by the malicious environment, and the runtime may allow such an attacker to access the application's inputs, tamper with the application's local storage, etc. It is also possible that a non-malicious enclosing environment may provide an application with a modified runtime environment that may cause unintended unreliable results.

For example, benevolent programs may also use virtualizations. For example, a MUGSHOT logging and replay tool may virtualize a web page's runtime to provide a useful, non-malicious service (e.g., the logging of application behavior for subsequent diagnosis of software bugs), as discussed in J. Mickens, et al., "MUGSHOT: Deterministic Capture and Replay for JAVASCRIPT Applications," *In Proceedings of the 7$^{th}$ USENIX Symposium on Networked Systems Design and Implementation* (NSDI'10), San Jose, Calif., Apr. 28-30, 2010. Even though this type of virtualization may be considered non-malicious, an application user may wish to avoid running applications in such a virtualized environment.

In this context, a "dynamic execution environment" may refer to an execution environment in which an application may be able to redefine some or all of the predefined objects and object references associated with the dynamic execution environment (e.g., functions such as the JAVASCRIPT "date" function).

Recent research results have described example techniques by which applications may be able to detect virtualized environments, e.g., by looking for behavioral quirks that are unique to a particular virtualization environment, but which do not exist in non-virtualized environments. These example approaches may assume that the runtime environment itself provides no anti-virtualization support to applications.

Example techniques discussed herein may involve an example service (e.g., a browser service) that uses properties of an application's object graph (e.g., other than behavioral properties) to determine whether a runtime (e.g., a JAVASCRIPT runtime) has been virtualized. For example, a secure web application may invoke this browser service to determine whether the application has been launched within a virtualized environment. If so, the application may refuse to execute, or may take other security measures. Such example techniques may be used, for example, in program execution environments that support dynamic redefinition of runtime objects (e.g., JAVASCRIPT, PYTHON interpreter, RUBY interpreter).

In this context, "virtualization" of an environment, or a "virtualized" environment may refer to an environment that are "counterfeit" or "fake" environments that are presented to applications in lieu of an actual environment. For example, an application running in a "virtualized" execution environment may execute using virtualized execution environment objects (e.g., functions, variables, constants) in the same way that the application would run in a non-virtualized execution environment, without realizing that the environment objects may have been modified by the "virtualized" execution environment. For example, an application may be configured to render a message "Hello" on a display device. Thus, the application may access one or more execution environment objects for rendering the message "Hello" on the display device. However, if the application is instead executing in a "virtualized" environment in which the execution environment objects have been modified to instead send "I want to break up with you, now" to a display of user's loved one, a user of the application may experience undesired results.

As another example, a user may request that a current date may be displayed, by calling an execution environment object such as a "date" function that may be configured to access a system date to provide that value for the user. However, a "virtualizing" environment may instead intercept the user's request via the call to the "date" function, and redefine the function to instead return a different result that is unexpected by the user.

As another example, an attacker may virtualize a victim environment's interface to local storage, allowing the attacker to arbitrarily inspect and modify persistent client-side state. For example, the attacker may also inject a remote debugging engine into a victim environment, allowing the attacker to examine the environment's JAVASCRIPT state in real time, as discussed in J. Mickens, "Rivet: Browser-agnostic Remote Debugging for Web Applications," *In Proceedings of USENIX Annual Technical Conference* (ATC'12), Boston, Mass., Jun. 13-15, 2012. As another example, an attacker may virtualize an entire JAVASCRIPT runtime and mediate substantially all of the victim environment's interactions with the outside world (e.g., the network, local storage, the screen, user input devices, and other frames on the browser).

In accordance with example techniques discussed herein, applications may detect virtualization attacks in dynamic execution platforms by leveraging predefined platform functions that reveal information associated with an application's object graph. Using these functions, applications may perform graph comparisons between a baseline, trusted (e.g., "known-good") object graph, and the object graph currently associated with the application. Differences between the baseline graph and the current graph may indicate a virtualization attack.

For example, the platform may provide a predefined function, which may be referred to herein as a "detectVirt( )" function," which may directly compare a baseline snapshot of the object graph to a snapshot of the current version of that graph.

For example, the platform may not provide a detectVirt( ) function, or a user may desire other means for detecting virtualizations. In accordance with example techniques discussed herein, if the platform provides other functions that reveal information associated with the object graph, and the code that defines such functions, then the application may first validate those functions, for example, by comparing their outputs to "known-good" expected outputs. The application may then use those functions to determine the structure of the current object graph, and compare that structure to a "known-good" structure.

II. Example Operating Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

As further discussed herein, FIG. 1 is a block diagram of a system 100 for detecting virtualization in dynamic runtime environments. As shown in FIG. 1, a system 100 may include a device 101 that includes a virtualization detection engine 102 that includes an environment state determination component 104 that may be configured to obtain a baseline set 106 of graph information associated with a predefined execution environment 108 of a program 110. The baseline set 106 is associated with a baseline time interval. For example, the baseline set 106 may indicate an initial state of the predefined execution environment 108 (e.g., at an initialization time of execution).

For example, the predefined execution environment 108 may include a JAVASCRIPT execution environment, and the program 110 may include a browser (e.g., INTERNET EXPLORER, MOZILLA FIREFOX, NETSCAPE, GOOGLE CHROME). The predefined execution environment 108 includes predefined environment objects 114, at least a portion of which are dynamically mutatable. The environment state determination component 104 may obtain a second set 116 of graph information associated with the predefined execution environment 108, the second set 116 associated with a second time interval that is later in time than the baseline time interval.

Dynamic execution environments (e.g., JAVASCRIPT, RUBY, PYTHON) involve predefined application runtimes. These predefined runtimes may include services that many programs may use frequently. For example, these services may include methods for accessing the current date, or sending information to a remote computer. Such predefined execution environments represent respective graphs. For example each node in the graph may include a predefined object or method, and each edge in the graph may include a reference that links two objects/methods. For example, in current web browsers, a HyperText Markup Language (HTML) structure of a web page may be represented in JAVASCRIPT using a data structure such as a Document Object Model (DOM) tree. For example, each element in the DOM tree is a JAVASCRIPT object. For example, if two HTML tags have a parent-child relationship, they may also have a parent-child relationship in the DOM tree (and thus an edge in the JAVASCRIPT object graph discussed above).

For example, virtualization activity may modify (e.g., via tampering activity) a runtime's predefined object graph. For example, in an example predefined JAVASCRIPT runtime that may be used by a browser, a predefined window object may include a reference to a predefined function named Date( ). Thus, a non-virtualized runtime for a JAVASCRIPT application may include an object representing the browser-supplied version of the window object, and may include an object representing the browser-supplied version of the Date( )method, and there may exist a link in the object graph between those two entities. In a virtualization event, a virtualizing entity (e.g., an attacker) might replace the predefined window object's link to the predefined Date( ) method, causing that link to point to a new, modified (e.g., malicious) version of the Date( ) method that was defined by the virtualizing entity, and which, for example, may returns an incorrect date to the application, or may log application invocations of Date( ) and send those results to a remote computer.

Virtualization events such as virtualization attacks may result in a change to the object graph that represents the application's runtime. Thus, a comparison of the predefined object graph with the graph representing a virtualized runtime may indicate that the two graphs are different, i.e., they may have a different set of nodes and/or a different set of edges.

Example techniques discussed herein may perform such a graph comparison. For example, a web browser (or more generally, a dynamic execution environment such as a PYTHON interpreter) may define a method (e.g., a function) which applications may invoke to determine whether the predefined runtime has been virtualized. The method, or predefined function, which may be referred to as detectVirt( ) for convenience, may operate as discussed further below.

As an example, after a browser generates a new execution context for an application (but before the new application is started), the browser may collect graph information for all of the predefined objects; for example, the browser may perform a breadth-first traversal of the object graph for each global variable, updating a list which represents the order in which various objects are encountered during the traversal. For example, the browser stores the graph information in a storage area which is inaccessible to the application or a virtualization attacker. Later, when the application invokes the function detectVirt( ) the browser may collect graph information for the current object graph, and may returns "true" if that information differs from the original data collected, and "false" otherwise. For example, the browser may perform a breadth-first traversal of the execution environment's current graph, checking whether the same set of references are encountered in the same order as they were during the initial graph traversal. If detectVirt( ) informs the application that the runtime has been virtualized, the application may terminate execution, attempt to warn the user that the runtime has been virtualized, or take some other action to prevent the virtualized environment from influencing the application's execution in an undesired way.

For example, a JAVASCRIPT environment may include a set of global variables in the JAVASCRIPT namespace. Each global variable may reference zero or more additional variables. In turn, each of those variables may reference zero or more additional variables. By recursively traversing the objects reachable from the global variables, a map of the object graph may be generated that represents the objects in the JAVASCRIPT runtime. For example, a "snapshot" of the graph may be generated, based on a breadth-first traversal (BFS) algorithm, using the set of global variables as the initial entries in the BFS queue. Nodes are then visited as the graph is traversed. Whenever a node is visited, a reference (e.g., a pointer) to that node may be stored in an initially empty list (e.g., if a node is a primitive value type such as a number, that primitive value may be stored in the list instead of a reference). When all of the objects have been visited, the list of references and primitive values represents a "snapshot" of the graph. For example, the snapshot may represent a log of the data encountered during the graph traversal, in the order that in which the data was encountered.

The detectVirt( ) function itself is not virtualizable. In other words, a dynamic execution environment is characterized by an ability for an application to redefine some or all of the predefined objects and object references. Applications may not redefine the detectVirt( ) function, nor may they redefine the names (i.e., the object references) that the system predefines to provide access to detectVirt( ). For example, this may thus prevent a virtualization attacker from redefining detectVirt( ) to remove its security checks. One skilled in the art of data processing will understand that some aspects of a dynamic runtime may not be changeable, while other aspects may be changeable.

According to an example embodiment, the virtualization detection engine 102, or one or more portions thereof, may include executable instructions that may be stored on a tangible computer-readable storage medium, as discussed below. According to an example embodiment, the computer-readable storage medium may include any number of storage devices, and any number of storage media types, including distributed devices.

For example, an entity repository 120 may include one or more databases, and may be accessed via a database interface component 122. One skilled in the art of data processing will appreciate that there are many techniques for storing repository information discussed herein, such as various types of database configurations (e.g., relational databases, hierarchical databases, distributed databases) and non-database configurations.

According to an example embodiment, the virtualization detection engine 102 may include a memory 124 that may store the graph information. In this context, a "memory" may include a single memory device or multiple memory devices configured to store data and/or instructions. Further, the memory 124 may span multiple distributed storage devices.

According to an example embodiment, a user interface component 126 may manage communications between a user 128 and the virtualization detection engine 102. The user 128 may be associated with a receiving device 130 that may be associated with a display 132 and other input/output devices. For example, the display 132 may be configured to communicate with the receiving device 130, via internal device bus communications, or via at least one network connection.

According to example embodiments, the display 132 may be implemented as a flat screen display, a print form of display, a two-dimensional display, a three-dimensional display, a static display, a moving display, sensory displays such as tactile output, audio output, and any other form of output for communicating with a user (e.g., the user 128).

According to an example embodiment, the virtualization detection engine 102 may include a network communication component 134 that may manage network communication between the virtualization detection engine 102 and other entities that may communicate with the virtualization detection engine 102 via at least one network 136. For example, the network 136 may include at least one of the Internet, at least one wireless network, or at least one wired network. For example, the network 136 may include a cellular network, a radio network, or any type of network that may support transmission of data for the virtualization detection engine 102. For example, the network communication component 134 may manage network communications between the virtualization detection engine 102 and the receiving device 130. For example, the network communication component 134 may manage network communication between the user interface component 126 and the receiving device 130.

As shown in FIG. 1, the virtualization detection engine 102 may be in communication with a device processor 138. In this context, a "processor" may include a single processor or multiple processors configured to process instructions associated with a processing system. A processor may thus include one or more processors processing instructions in parallel and/or in a distributed manner. Although the device processor 138 is depicted as external to the virtualization detection engine 102 in FIG. 1, one skilled in the art of data processing will appreciate that the device processor 138 may be implemented as a single component, and/or as distributed units which may be located internally or externally to the virtualization detection engine 102, and/or any of its elements.

For example, the system 100 may include one or more processors 138. For example, the system 100 may include at least one tangible computer-readable storage medium storing instructions executable by the one or more processors, the executable instructions configured to cause at least one data processing apparatus to perform operations associated with various example components included in the system 100, as discussed herein. For example, the one or more processors 138 may be included in the at least one data processing apparatus. One skilled in the art of data processing will understand that there are many configurations of processors and data processing apparatuses that may be configured in accordance with the discussion herein, without departing from the spirit of such discussion.

In this context, a "component" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components).

An environment state comparison component 140 may be configured to compare the baseline set 106 and the second set 116 to detect virtualization activity associated with a dynamic runtime.

For example, comparing two graphs for equivalence may involve obtaining "snapshots" of the two graphs. For example, if the snapshot lists have different sizes, then the graphs may be considered unequal (i.e., a modifying entity has modified the runtime represented by the second graph). If the snapshots have the same size (or substantially the same size), then it is possible to iterate through the snapshot lists, comparing the first element in both lists, and then the second element in both lists, and so on. For example, if, at any point, the two items are not the same (or substantially the same), the two graphs may be determined as not being equivalent. If the entirety of both lists are iterated through and it is determined that all of the elements (or substantially all of the elements) are equal, then the two graphs may be determined as being equivalent (e.g., given a deterministic search algorithm and two isomorphic graphs, the search may visit the same vertices in each graph in the same order).

For example, the predefined environment objects 114 that are dynamically mutatable may include one or more of environment variables 142, environment functions 144, environment references 146, environment constant values 148, or environment state values 149.

For example, the predefined execution environment 108 of the program 110 may include one or more of a predefined JAVASCRIPT execution environment of a web browser, a predefined RUBY execution environment, or a predefined PYTHON execution environment.

For example, second set 116 of graph information may be obtained via invocation of a first non-virtualizable function 119 that is defined by the predefined execution environment 108.

For example, a supplemental graph component 150 may be configured to obtain a first supplemental set 152 of graph information associated with a program graph that is induced based on predefined program objects of the program 110, and predefined relationships between the predefined program objects, at the baseline time interval.

For example, the supplemental graph component 150 may be configured to obtain a second supplemental set 156 of graph information associated with the program graph, at the second time interval.

For example, the first supplemental set 152 may be added to the baseline set 106 of graph information via a second non-virtualizable function 158 invoked by the program 110, the second non-virtualizable function 158 defined by the predefined execution environment 108.

For example, the second supplemental set 156 may be added to the second set 116 of graph information via the second non-virtualizable function 158.

For example, the environment state comparison component 140 may be configured to compare the baseline set 106 and the second set 116 based on comparing the baseline set 106 that includes the first supplemental set 152 and the second set 116 that includes the second supplemental set 156, to detect the virtualization activity associated with the dynamic runtime.

For example, an application may add, remove, or otherwise modify the parts of the object graph that correspond to application-defined data. For example, when applications redefine their own data, this may not represent a virtualization attack, and detectVirt( ) need not check those parts of the object graph for modification. In other words, in a "minimal" implementation, detectVirt( ) may check the predefined object graph that is provided by the dynamic runtime (e.g., the web browser, the PYTHON interpreter, etc.). However, in accordance with another aspect, detectVirt( ) may check portions of the application-defined graph for inappropriate (or unintended) modification. For example, the dynamic runtime may expose a second anti-virtualization function (or method), which may be referred to herein addRootToProtectedGraph (obj). By invoking this function, the application may inform the dynamic runtime (e.g., the web browser) to add the object graph reachable from "obj" to the larger graph that detectVirt( ) checks when it is determining potential virtualization activity (e.g., mutation activity). For example, it may be desirable that the functions detectVirt( ) addRootToProtectedGraph( ) may not be virtualizable.

For example, the baseline set 106 of graph information may include baseline state information associated with the predefined execution environment objects 114 and relationships between the predefined execution environment objects 114, at the baseline time interval. For example, a graph associated with the baseline set 106 of graph information is induced based on graph nodes representing the predefined execution environment objects 114 and graph edges representing the relationships between the predefined execution environment objects 114.

For example, the second set 116 of graph information may include second state information associated with the predefined execution environment objects 114 and the relationships between the predefined execution environment objects 114, at the second time interval.

For example, the environment state determination component 104 may be configured to obtain the baseline set 106 of graph information based on recursively first traversing nodes representing predefined execution environment objects 114 that are reachable via references from global variables in the predefined execution environment 108, at the baseline time interval, and storing values associated with first traversal visited nodes in a first list 162.

For example, the environment state determination component 104 may be configured to obtain the second set 116 of graph information based on recursively second traversing the nodes representing the predefined execution environment objects 114 that are reachable via references from global variables in the predefined execution environment 108, at the second time interval, and storing values associated with second traversal visited nodes in a second list 164.

For example, the environment state comparison component 140 may be configured to compare the baseline set 106 and the second set 116 based on one or more of comparing a size of the first list 162 with a size of the second list 164, or comparing a value of each element of the first list 162 to a value of a corresponding element of the second list 164.

For example, a graph caching component 166 may be configured to initiate storage of the baseline set 106 of graph information in a private storage location 168 that is privately available to the predefined execution environment 108, wherein the baseline set 106 of graph information is available for use by the predefined execution environment 108, in lieu of at least a portion of the predefined environment objects 114 that are dynamically mutatable.

For example, the environment state determination component 104 may be configured to obtain a third set 170 of graph information associated with the predefined execution environment 108, at a third time interval that is later in time than the second time interval, the third set 170 obtained via invocation of the first non-virtualizable function 119.

For example, the environment state comparison component 140 may be configured to compare the baseline set 106 and the third set 170 to detect virtualization activity associated with the dynamic runtime.

For example, an environment function validation component 172 may be configured to initiate validation of current output of at least one function that is defined by the predefined execution environment 108. For example, the baseline set 106 of graph information may be obtained via invocation of the at least one function after validation of output, as discussed further herein. For example, the second set 116 of graph information may be obtained via invocation of the at least one function after validation of output.

FIGS. 2a-2b are block diagrams of example applications and execution environments. As shown in FIG. 2a, a web page 202 may use a browser interface 204 to invoke services of a web browser 206. For example, the web page 202 may use an application programming interface (API) of the browser interface 204 to invoke the services. As shown in FIG. 2b, the web page 202 may use a virtualization layer 208 to invoke the services of the web browser 206. For example, the virtualization layer 208 may use the browser interface 204 to access the services of the web browser 206, and may modify actions and results requested by the web page 202 (e.g., as a "fake" or "counterfeit" version of the browser interface 204).

For example, JAVASCRIPT is a dynamically-typed, object-oriented scripting language. The core language defines basic data types such as strings and regular expressions; recently, web browsers may extend this core with a DOM interface which may expose browser resources such as cookies, HyperText Transfer Protocol (HTTP) connections, and HTML/Cascading Style Sheets (CSS) state. The DOM interface also provides mechanisms for collecting graphical user interface (GUI) inputs, manipulating graphics, spawning new pages, and sending messages to preexisting client-side pages.

For example, the JAVASCRIPT language defines a substantially permissive reflection model. For example, each JAVASCRIPT object may represent a dictionary that maps property names to property values. Using introspection APIs such as the for-in iteration statement and the Object.getOwnPropertyNames( ) call, an application may discover an object's properties.

By default, object properties are mutable, and dynamic object modification is a JAVASCRIPT attribute. To limit such activity, an application may associate an object property with an access descriptor. A descriptor may mark its property as read-only, or associate the property with getter/setter functions that interpose on all accesses to that property and perform context-sensitive access controls. However, such descriptors may be rarely used by the predefined JAVASCRIPT objects in the core runtime, resulting in their properties being potentially vulnerable to virtualization by unscrupulous code. Furthermore, attackers may elude descriptor checks altogether by virtualizing an entire sensitive object instead of selectively replacing individual properties on that object.

Further, JAVASCRIPT is an object-oriented language, but unlike JAVA or C#, JAVASCRIPT supports inheritance using dynamic prototypes instead of static classes. Each JAVASCRIPT object has a special property called __proto__ that points to another JAVASCRIPT object. That object, referred to as the prototype, represents an exemplar for all instances of a class. Each instance inherits the properties defined by its prototype; assigning to such a property on an instance object overwrites the property definition for that instance. Since the prototype object is a regular JAVASCRIPT object, its properties may also be modified at runtime. Thus, the instance properties of a particular class may also change at runtime.

Code may also dynamically modify the class of an object by assigning a new value to its __proto__ property. For a constructor function C, the property C.prototype is the default __proto__ value for objects created via new CO.

JAVASCRIPT functions are first-class objects, as that they may define properties similar to any other object. They also implement the methods defined by Function.prototype.

The predefined Function.prototype.toString( ) method returns a string that represents the source code for a function. If the function is defined by the application, the string represents JAVASCRIPT source code. However, if the function is a built-in, i.e., implemented by the browser in C++, Function.toString( ) returns "function funcName( ){[native code]}". For example, Function.prototype.toString( ) is a native method, as are the methods belonging to regular expressions and DOM objects.

In JAVASCRIPT, an iframe may represent an isolated JAVASCRIPT execution context. Each iframe may be single-threaded, containing an event loop that executes application-defined event handlers for GUI activity, timer callbacks, the reception of network data, etc. A frame's origin may include the protocol, hostname, and port used to fetch the frame's HTML. The same-origin policy prevents two frames with different origins from accessing each other's JAVASCRIPT state. However, two frames with different origins may communicate using the postMessage( )JAVASCRIPT function. This function allows frames to exchange asynchronous, immutable strings with each other. Iframes provide substantial isolation between web applications.

Iframes may provide substantial isolation between web applications. However, within a given frame, JAVASCRIPT provides few mechanisms for code to isolate itself from other code in that frame. Besides the property descriptors mentioned above, JAVASCRIPT provides closures, which are functions that lexically bind to the variables in their enclosing stack frame. Algorithm 1 below illustrates an example of a closure.

Algorithm 1
Closure Example

```
function closureGenerator (x){
    var y = 12;
    var closure = function ( ){
        return x + y;
    };
    return closure ;
}
var c = closureGenerator (30);
alert (c ( )); // Displays "42"
```

As shown in Algorithm 1, when closureGenerator( ) is invoked, the inner function closure( ) binds to the variables x and y that reside in the activation record for closureGenerator( ). When closureGenerator( ) returns and the activation record pops off the stack, closure( ) maintains a reference to the record. This allows closure( ) to later access x and y.

Closures do not expose their bound variables to external code. Thus, closures may be used as information hiding mechanisms. For example, a caller may place sensitive data inside a closure, and pass the closure to untrusted code. The untrusted code will only be able to manipulate the hidden variables by invoking the trusted closure function.

Virtualization attacks may subvert both iframe isolation and closure isolation. For example, by virtualizing DOM metadata, an attacker may virtualize the iframe interface, deluding a victim application into thinking that it has strong iframe isolation even when it does not. Closures are also vulnerable to virtualization attacks, since any global variable that they access may be a virtualized one.

The JAVASCRIPT runtime defines interfaces that allow an application to interact with the outside world. For example, the JAVASCRIPT Date( ) function returns the current time, and the XMLHttpRequest class allows an application to fetch HTTP data from remote servers. The runtime exposes local storage via the cookie interface (which is may be limited to 4 KB of data), and the DOM storage interface (which provides each origin with key-value storage). The runtime also provides the DOM tree, which may include a JAVASCRIPT representation of a page's HTML structure. By manipulating the DOM tree, a program may dynamically change the structure and presentation of its visual content. For example, if these interfaces are virtualized, an attacker may return false timestamps to a victim page, tamper with a victim's network traffic, arbitrarily modify the victim's visual representation, etc.

The detectVirt( ) function discussed above may be implemented by the dynamic execution platform. However, applications may find themselves running on dynamic execution platforms that do not support detectVirt( ). These applications may still wish to detect virtualized environments. To do so, these applications may, for example, leverage other predefined runtime functions that provide information about the current state of the application's object graph. For example, the application may validate these functions by checking what the predefined runtime functions output when presented with a set of inputs whose outputs from non-virtualized functions are known in advance. For example, once the functions are validated, the application may use the functions to validate other parts of the object graph.

Example techniques discussed herein may leverage at least two built-in JAVASCRIPT functions to detect virtualized environments: Function.prototype.toString( ) and Object.prototype.toString( ). For example, Function.prototype.toString( ) allows a JAVASCRIPT program to access the source code of functions (unless the function is a built-in function implemented by the browser in C++, in which case Function.prototype.toString( ) returns "function f( ){[native code]}". When passed a native object, Object.prototype.toString( ) returns the class of the object. For example, when passed the document object, it returns "[object HTMLDocument]"; when passed a regular expression, it returns "[object RegExp]".

To test for virtualized environments, an example technique may first run a suite of validity tests on Function.prototype.toString( ). If those tests pass, Function.prototype.toString( ) may be trusted to report the source code for an application-defined method, or the name and the native code nature of a native function. For example, Function.prototype.toString( ) may then be used to validate Object.prototype.toString( ). Once Object.prototype.toString( ) is validated, it may be used to validate that ostensibly native runtime objects are actually native in origin. For example, Object.prototype.toString( ) may then be used to validate DOM objects such as documents.

For example, once core global methods and objects are validated, references to them may be cached in a dictionary. The application may later use these references to interact with safe, known-good versions of the core runtime objects. For example, the validated XML-HttpRequest object may then be used to synchronously fetch and eval( ) the secure application's JAVASCRIPT code.

For example, Function.prototype.toString( ) may be used to validate native functions. For example, Algorithm 2 below illustrates an example of an attack.

Algorithm 2
Attack Example

```
Attack 0
    var Date = function( ){
        return maliciousValue( );
    };
```

As shown in Algorithm 2, Attack 0 represents a virtualization attack in which the malicious code overwrites a native function such as Date( ) with attacker-controlled code. For example, Algorithm 3 illustrates an example of an attack detection.

| Algorithm 3 |
| --- |
| Detection Example |
| Detection 0
if(Date.toString( ) != "function Date( ){
   [native code]
}"){
   throw "Attack detected";
} |

As shown in Algorithm 3, Detection 0 represents a detection of such attacks. As shown in Algorithm 3, the native method Date.toString( ) may be invoked, to return the source code for the now-virtualized function instead of the expected source code of "function Date( ){[native code]}".

One skilled in the art of data processing that many other types of detection may be utilized, without departing from the spirit of the discussion herein.

JAVASCRIPT is single-threaded within a particular frame. After a frame's initial JAVASCRIPT code runs, the browser may fire application-defined event handlers, but it may execute one handler at any given time. Thus, although the DOM tree may be validated at initialization time, an attacker may subsequently virtualize the DOM tree between invocations of a secure application's event handlers. Therefore, validated copies of Function.prototype.toString( ) and Object.prototype.toString( ) may be cached, so that, for example, DOM objects may continue to be validated on the behalf of the secure application. However, if a secure application is concerned with the visual layout or GUI inputs of a page, then whenever a DOM-manipulating handler loads, it may re-validate the entire DOM tree before updating it. Such revalidation may be expensive for visually complex sites. Therefore, DOM-intensive secure applications may use example techniques discussed herein to validate a minimal amount of state for creating a virgin iframe via JAVASCRIPT; the application may then spawn a full version of the application inside this virgin, known-clean frame. The full version of the page may use frame-busting code with confidence because example techniques discussed herein may determine that the new frame is non-virtualized. For example, a library may explicitly define a bootstrap( ) function to perform such validation followed by a frame-busting page launch.

Re-validation issues may not be a concern for libraries that do not manipulate the DOM tree. For example, a cryptographic library or an RPC-over-AJAX library may not habitually re-validate cached versions of Math.random( ) or XMLHttpRequest, as the virtualization attacker may not successfully rewrite the obfuscated code, and thus may not puncture the closure in which example techniques herein may stores cached references to native runtime objects. Under this assumption, other obfuscated applications may also protect closured references to native objects.

For example, browsers may define a detectVirt( ) function to assist security-sensitive applications. At load time, a secure application may call detectVirt( ) The browser may inspect the global runtime objects such as Date( ) XMLHttpRequest, and Math.random( ); for each variable, the browser may inspect the object graph rooted at that variable, checking for isomorphism between that graph and the one that is rooted by the browser's canonical version of that global variable. For example, when the browser itself loads, it may perform a breadth-first traversal of the object graph for each global variable, compiling a list of the references encountered during the traversal. Later, when the browser checks a global variable for virtualization, it may performs a breadth-first traversal of the global object's current graph, checking whether the same set of references are encountered in the same order.

If the two graphs are isomorphic, i.e., they define the same relationships between prototype objects and object properties, then the associated global variable has not likely been virtualized. If all global variables pass this test, then detectVirt( ) returns true, and the secure application may have some confidence that a virtualization attack has not occurred. At this point, the program may take application-specific measures, e.g., caching references to the non-virtualized objects for subsequent use.

III. Flowchart Description

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

FIG. 3 is a flowchart illustrating example operations of the system of FIG. 1, according to example embodiments. In the example of FIG. 3a, a baseline set of graph information associated with a predefined execution environment of a program may be obtained, the baseline set associated with a baseline time interval, the predefined execution environment including predefined environment objects, at least a portion of the predefined environment objects being dynamically mutatable (302). For example, the environment state determination component 104 may obtain the baseline set 106 of graph information associated with the predefined execution environment 108 of the program 110, as discussed above.

A second set of graph information associated with the predefined execution environment may be obtained, the second set associated with a second time interval that is later in time than the baseline time interval (304). For example, the environment state determination component 104 may obtain the second set 116 of graph information, as discussed above.

The baseline set and the second set may be compared to detect virtualization activity associated with a dynamic runtime (306). For example, the environment state comparison component 140 may compare the baseline set 106 and the second set 116, as discussed above.

For example, the predefined environment objects that are dynamically mutatable may include one or more of environment variables, environment functions, environment references, environment constant values, or environment state values (308).

For example, the predefined execution environment of the program may include one or more of a predefined JAVASCRIPT execution environment of a web browser, a predefined RUBY execution environment, or a predefined PYTHON execution environment (310).

For example, the baseline set of graph information may include baseline state information associated with predefined execution environment objects and relationships between the predefined execution environment objects, at the baseline time interval, wherein a graph associated with the baseline set of graph information is induced based on graph nodes representing the predefined execution environment objects and graph edges representing the relationships between the predefined execution environment objects (312), as indicated in FIG. 3b.

For example, the second set of graph information may include second state information associated with the predefined execution environment objects and the relationships between the predefined execution environment objects, at the second time interval (314).

For example, the baseline set of graph information may be obtained based on recursively first traversing nodes representing predefined execution environment objects that are reachable via references from global variables in the predefined execution environment, at the baseline time interval, and storing values associated with first traversal visited nodes in a first list (316). For example, the environment state determination component 104 may obtain the baseline set 106 of graph information based on recursively first traversing nodes representing predefined execution environment objects 114 that are reachable via references from global variables in the predefined execution environment 108, at the baseline time interval, and storing values associated with first traversal visited nodes in the first list 162, as discussed above.

For example, the second set of graph information may be obtained based on recursively second traversing the nodes representing the predefined execution environment objects that are reachable via references from global variables in the predefined execution environment, at the second time interval, and storing values associated with second traversal visited nodes in a second list (318). For example, the environment state determination component 104 may obtain the second set 116 of graph information based on recursively second traversing the nodes representing the predefined execution environment objects 114 that are reachable via references from global variables in the predefined execution environment 108, as discussed above.

For example, the baseline set and the second set may be compared based on one or more of comparing a size of the first list with a size of the second list, or comparing a value of each element of the first list to a value of a corresponding element of the second list (320). For example, the environment state comparison component 140 may compare the baseline set 106 and the second set 116 based on one or more of comparing a size of the first list 162 with a size of the second list 164, or comparing a value of each element of the first list 162 to a value of a corresponding element of the second list 164, as discussed above.

Figure 3A:
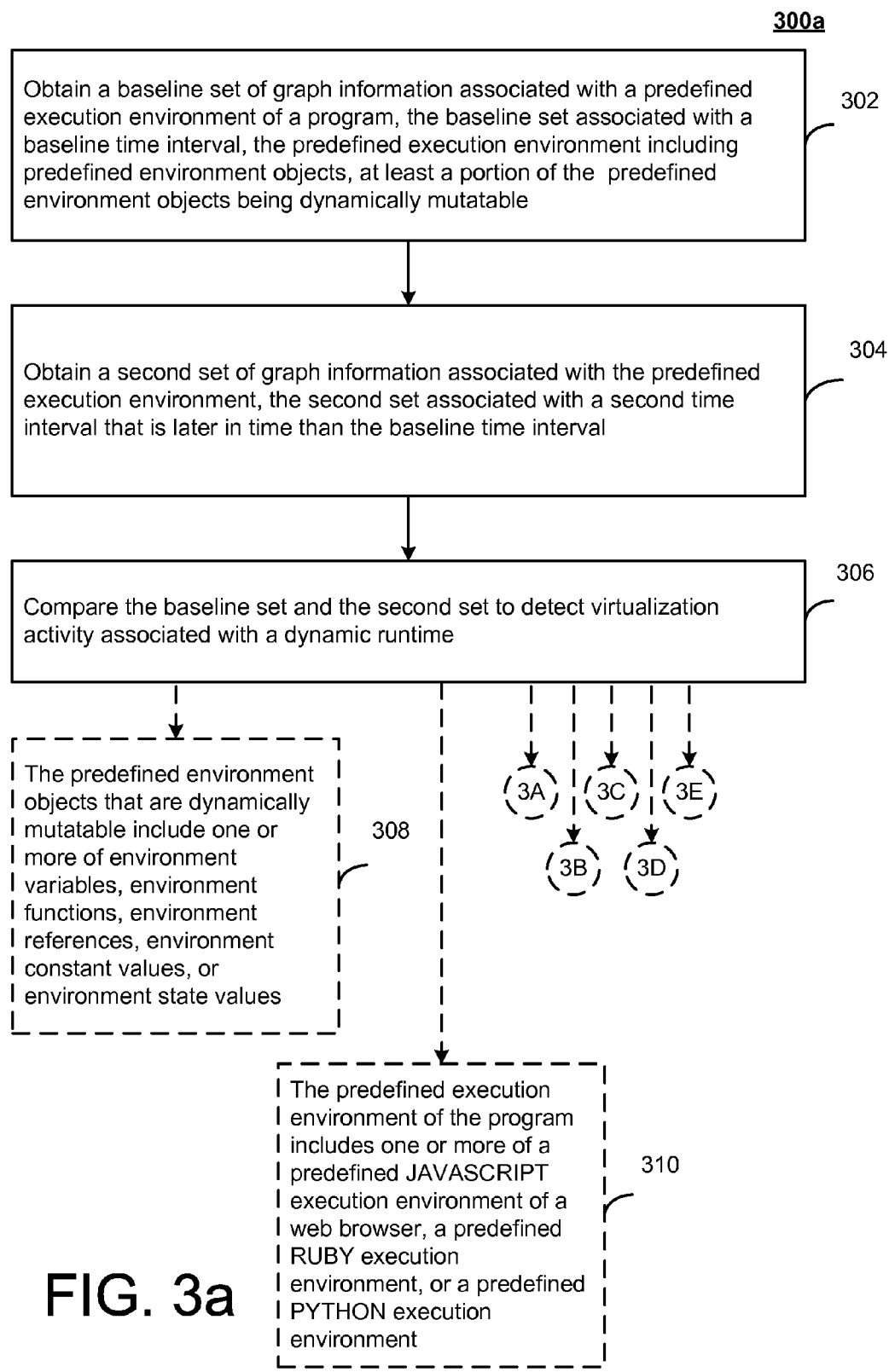
Figure 3C:
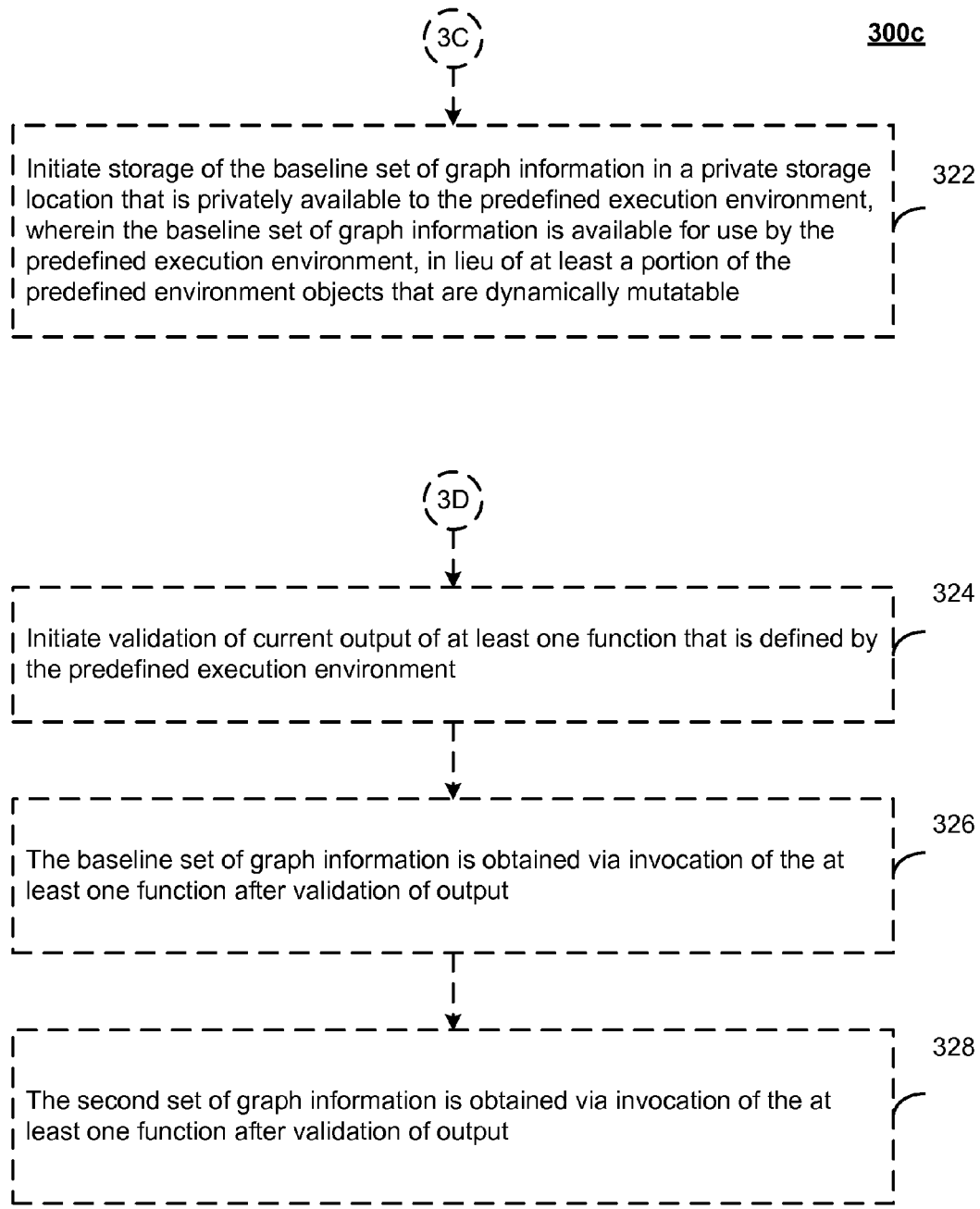

For example, storage of the baseline set of graph information in a private storage location that is privately available to the predefined execution environment may be initiated, wherein the baseline set of graph information is available for use by the predefined execution environment, in lieu of at least a portion of the predefined environment objects that are dynamically mutatable (322), as indicated in FIG. 3c. For example, the graph caching component 166 may initiate storage of the baseline set 106 of graph information in a private storage location 168 that is privately available to the predefined execution environment 110, as discussed above.

For example, validation of current output of at least one function that is defined by the predefined execution environment may be initiated (324). For example, the environment function validation component 172 may initiate the validation, as discussed above.

For example, the baseline set of graph information may be obtained via invocation of the at least one function after validation of output (326). For example, the second set of graph information may be obtained via invocation of the at least one function after validation of output (328).

Figure 3D:
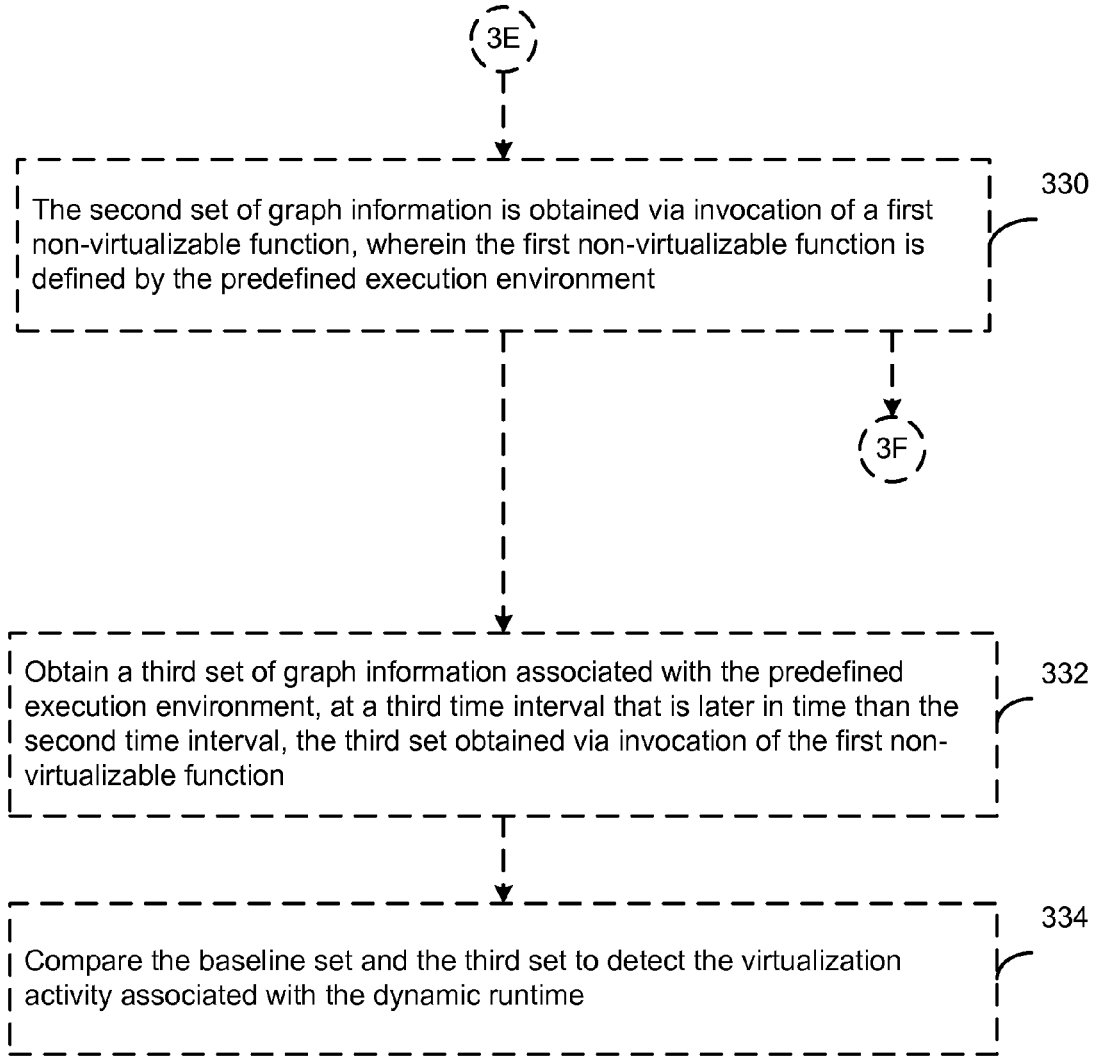

For example, the second set of graph information may be obtained via invocation of a first non-virtualizable function, wherein the first non-virtualizable function is defined by the predefined execution environment (330), as indicated in FIG. 3d.

For example, a third set of graph information associated with the predefined execution environment may be obtained, at a third time interval that is later in time than the second time interval, the third set obtained via invocation of the first non-virtualizable function (332). For example, the environment state determination component 104 may obtain the third set 170 of graph information associated with the predefined execution environment 108, as discussed above.

For example, the baseline set and the third set may be compared to detect virtualization activity associated with the dynamic runtime (334). For example, the environment state comparison component 140 may compare the baseline set 106 and the third set 170 to detect virtualization activity associated with the dynamic runtime, as discussed above.

Figure 3E:
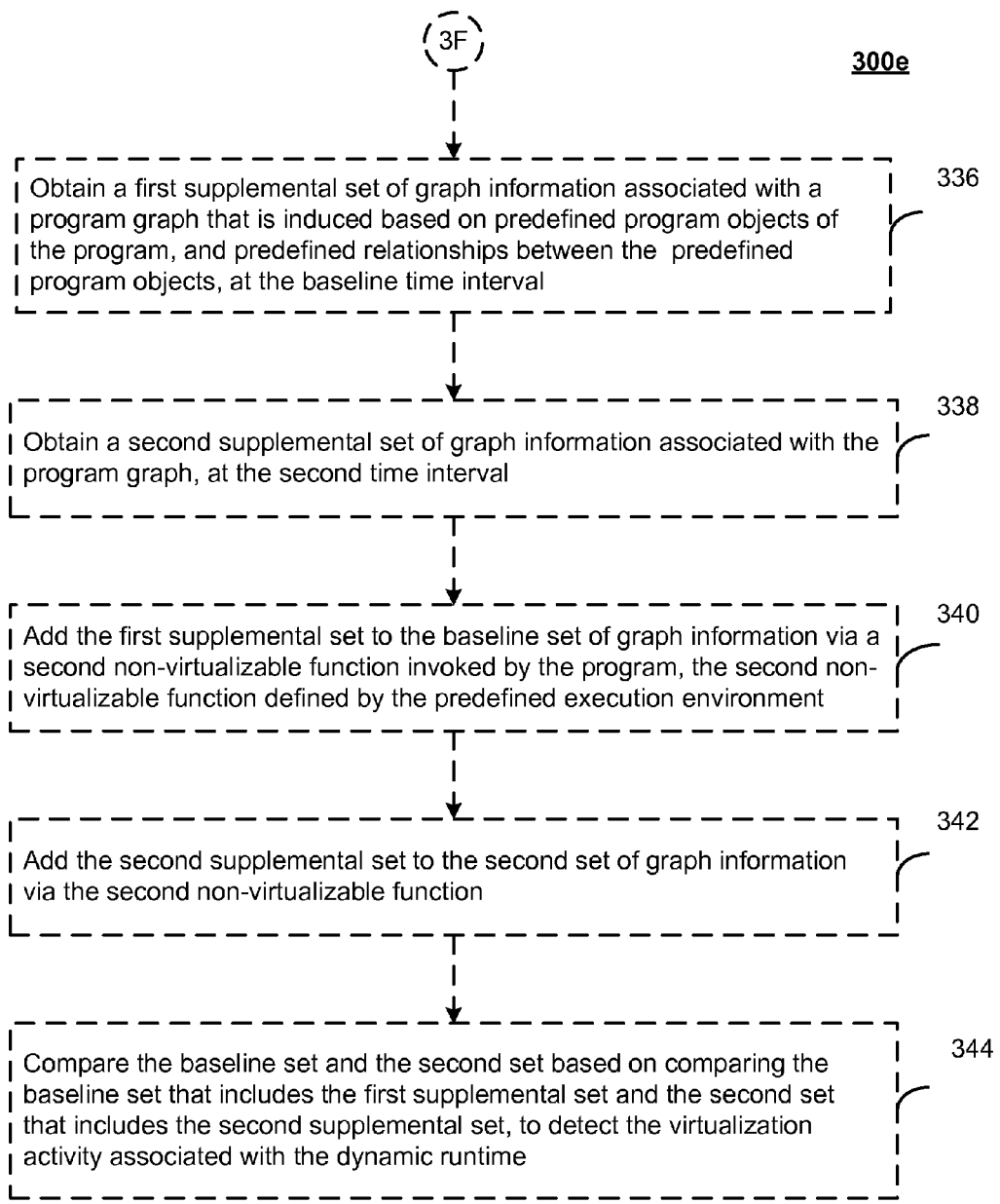

For example, a first supplemental set of graph information associated with a program graph that is induced based on predefined program objects of the program, and predefined relationships between the predefined program objects, may be obtained, at the baseline time interval (336), as indicated in FIG. 3e. For example, the supplemental graph component 150 may obtain the first supplemental set 152 of graph information associated with the program graph that is induced based on predefined program objects of the program 110, and predefined relationships between the predefined program objects, at the baseline time interval, as discussed above.

For example, a second supplemental set of graph information associated with the program graph may be obtained, at the second time interval (338). For example, the supplemental graph component 150 may obtain the second supplemental set 156 of graph information associated with the program graph, at the second time interval, as discussed above.

For example, the first supplemental set may be added to the baseline set of graph information via a second non-virtualizable function invoked by the program, the second non-virtualizable function defined by the predefined execution environment (340).

For example, the second supplemental set may be added to the second set of graph information via the second non-virtualizable function (342).

For example, the baseline set and the second set may be compared based on comparing the baseline set that includes the first supplemental set and the second set that includes the second supplemental set, to detect the virtualization activity associated with the dynamic runtime (344). For example, the environment state comparison component 140 may compare the baseline set 106 and the second set 116 based on comparing the baseline set 106 that includes the first supplemental set 152 and the second set 116 that includes the second supplemental set 156, to detect the virtualization activity associated with the dynamic runtime, as discussed above.

FIG. 4 is a flowchart illustrating example operations of the system of FIG. 1, according to example embodiments. In the example of FIG. 4a, a baseline set of state information associated with predefined execution environment objects that are dynamically mutatable, and that are included in a predefined execution environment of a program, may be obtained, at least a portion of the predefined execution environment objects being dynamically mutatable, the baseline set of state information indicating a baseline state of the predefined execution environment at a baseline time interval (402). For example, the environment state determination component 104 may obtain the baseline set 106, as discussed above.

A second set of state information associated with the predefined execution environment objects may be obtained, the second set of state information indicating a second state of the predefined execution environment at a second time interval that is later in time than the baseline time interval (404). For example, the environment state determination component 104 may obtain the second set 116, as discussed above.

A comparison of the baseline set and the second set may be initiated to determine virtualization activity associated with a dynamic runtime (406). For example, the environment state comparison component 140 may compare the baseline set 106 and the second set 116, as discussed above.

For example, a validation of current output of at least one function that is defined by the predefined execution environment may be initiated (408). For example, the environment function validation component 172 may initiate the validation, as discussed above.

For example, the baseline set of graph information may be obtained via invocation of the at least one function after validation of output (410). For example, the second set of graph information may be obtained via invocation of the at least one function after validation of output (412), as discussed above.

For example, the baseline set of state information may be obtained based on obtaining a baseline set of graph information associated with the predefined execution environment of the program, wherein a graph associated with the baseline set of graph information is induced based on graph nodes representing the predefined execution environment objects and graph edges representing the relationships between the predefined execution environment objects (414), as indicated in FIG. 4*b*.

For example, the second set of state information may be obtained based on obtaining a second set of graph information associated with the predefined execution environment of the program, wherein a graph associated with the second set of graph information is induced based on the graph nodes representing the predefined execution environment objects and the graph edges representing the relationships between the predefined execution environment objects, at the second time interval (416).

For example, the baseline set of graph information may include baseline state information associated with the predefined execution environment objects and relationships between the predefined execution environment objects, at the baseline time interval, wherein a graph associated with the baseline set of graph information is induced based on graph nodes representing the predefined execution environment objects and graph edges representing the relationships between the predefined execution environment objects (418).

For example, the second set of graph information may include second state information associated with the predefined execution environment objects and the relationships between the predefined execution environment objects, at the second time interval (420).

For example, the second set of state information may be obtained via invocation of a first non-virtualizable function, wherein the first non-virtualizable function is defined by the predefined execution environment (422), as indicated in FIG. 4*c*

For example, the baseline set of graph information may be obtained based on recursively first traversing nodes representing predefined execution environment objects that are reachable via references from global variables in the predefined execution environment, at the baseline time interval, and storing values associated with first traversal visited nodes in a first list (424).

For example, the second set of graph information may be obtained based on recursively second traversing the nodes representing the predefined execution environment objects that are reachable via references from global variables in the predefined execution environment, at the second time interval, and storing values associated with second traversal visited nodes in a second list (426).

For example, the comparison of the baseline set and the second set may be initiated based on one or more of comparing a size of the first list with a size of the second list, or comparing a value of each element of the first list to a value of a corresponding element of the second list (428).

FIG. 5 is a flowchart illustrating example operations of the system of FIG. 1, according to example embodiments. In the example of FIG. 5*a*, a baseline set of graph information associated with a predefined JAVASCRIPT execution environment of a web browser may be obtained, the baseline set indicating a baseline state of the predefined JAVASCRIPT execution environment at a baseline time interval (502). For example, the environment state determination component 104 may obtain the baseline set 106 of graph information associated with the predefined execution environment 108 of the program 110, as discussed above.

A second set of graph information associated with the predefined JAVASCRIPT execution environment may be obtained, the second set indicating a second state of the predefined JAVASCRIPT execution environment at a second time interval that is later in time than the baseline time interval (504). For example, the environment state determination component 104 may obtain the second set 116 of graph information, as discussed above.

The baseline set and the second set may be compared to detect virtualization activity associated with a dynamic runtime (506). For example, the environment state comparison component 140 may compare the baseline set 106 and the second set 116, as discussed above.

For example, the second set of graph information may be obtained via a first non-virtualizable function invoked by the web browser, the first non-virtualizable function defined by the predefined JAVASCRIPT execution environment (508), as discussed above.

For example, a validation of current output of at least one function that is defined by the predefined JAVASCRIPT execution environment may be initiated (510). For example, the environment function validation component 172 may initiate the validation, as discussed above.

For example, the baseline set of graph information may be obtained via invocation of the at least one function after validation of output (512), as discussed above. For example, the second set of graph information may be obtained via invocation of the at least one function after validation of output (514).

One skilled in the art of data processing will understand that there are many ways of detecting virtualization in dynamic runtime environments, without departing from the spirit of the discussion herein.

Customer privacy and confidentiality have been ongoing considerations in data processing environments for many years. Thus, example techniques for virtualization detection may use user input and/or data provided by users who have provided permission via one or more subscription agreements (e.g., "Terms of Service" (TOS) agreements) with associated applications or services associated with browsing. For example, users may provide consent to have their input/data transmitted and stored on devices, though it may be explicitly indicated (e.g., via a user accepted text agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in a pure signal such as a pure propagated signal. Such implementations may be referred to herein as implemented via a "computer-readable transmission medium."

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a "computer-readable storage medium" or a "computer-readable storage device" and are thus different from implementations that are purely signals such as pure propagated signals.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable storage medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
a device that includes at least one processor, and a computer readable storage medium storing instructions for execution by the at least one processor, for implementing a virtualization detection engine that:
obtains a baseline set of graph information associated with a predefined execution environment of a program, the baseline set associated with a baseline time interval, the predefined execution environment including predefined environment objects, at least a portion of the predefined environment objects being dynamically mutatable;
obtains a second set of graph information associated with the predefined execution environment, the second set associated with a second time interval that is later in time than the baseline time interval;
initiates storage of the baseline set of graph information in a private storage location that is privately available to the predefined execution environment; and
detects virtualization activity associated with a dynamic runtime by comparing the baseline set and the second set.

2. The system of claim 1, wherein:
the predefined environment objects that are dynamically mutatable include one or more of:
environment variables,
environment functions,
environment references,
environment constant values, or
environment state values.

3. The system of claim 1, wherein:
the predefined execution environment of the program includes one or more of:
a predefined JAVASCRIPT execution environment of a web browser,
a predefined RUBY execution environment, or
a predefined PYTHON execution environment.

4. The system of claim 1, wherein:
the second set of graph information is obtained via invocation of a first non-virtualizable function, wherein the first non-virtualizable function is defined by the predefined execution environment.

5. The system of claim 4, wherein the virtualization detection engine further:
obtains a first supplemental set of graph information associated with a program graph that is induced based on predefined program objects of the program, and predefined relationships between the predefined program objects, at the baseline time interval,
obtains a second supplemental set of graph information associated with the program graph, at the second time interval,
adds the first supplemental set to the baseline set of graph information via a second non-virtualizable function invoked by the program, the second non-virtualizable function defined by the predefined execution environment, and
adds the second supplemental set to the second set of graph information via the second non-virtualizable function, wherein:
comparing the baseline set and the second set includes comparing the baseline set that includes the first supplemental set and the second set that includes the second supplemental set, to detect the virtualization activity associated with the dynamic runtime.

6. The system of claim 4, wherein the virtualization detection engine further:
obtains a third set of graph information associated with the predefined execution environment, at a third time interval that is later in time than the second time interval, the third set obtained via invocation of the first non-virtualizable function, wherein:
detecting the virtualization activity associated with the dynamic runtime is based on comparing the baseline set and the third set.

7. The system of claim 1, wherein:
the baseline set of graph information includes baseline state information associated with the predefined execution environment objects and relationships between the predefined execution environment objects, at the baseline time interval, wherein a graph associated with the baseline set of graph information is induced based on graph nodes representing the predefined execution environment objects and graph edges representing the relationships between the predefined execution environment objects, and
the second set of graph information includes second state information associated with the predefined execution environment objects and the relationships between the predefined execution environment objects, at the second time interval.

8. The system of claim 1, wherein the virtualization detection engine:
obtains the baseline set of graph information based on recursively first traversing nodes representing predefined execution environment objects that are reachable via references from global variables in the predefined execution environment, at the baseline time interval, and storing values associated with first traversal visited nodes in a first list, and
obtains the second set of graph information based on recursively second traversing the nodes representing the predefined execution environment objects that are reachable via references from global variables in the predefined execution environment, at the second time interval, and storing values associated with second traversal visited nodes in a second list.

9. The system of claim 8, wherein:
the virtualization detection engine compares the baseline set and the second set based on one or more of:
comparing a size of the first list with a size of the second list, or
comparing a value of each element of the first list to a value of a corresponding element of the second list.

10. The system of claim 1,
wherein the baseline set of graph information is available for use by the predefined execution environment, in lieu of at least a portion of the predefined environment objects that are dynamically mutatable.

11. The system of claim 1,
wherein the virtualization detection engine initiates validation of current output of at least one function that is defined by the predefined execution environment, wherein
the baseline set of graph information is obtained via invocation of the at least one function after validation of output, wherein the second set of graph information is obtained via invocation of the at least one function after validation of output.

12. A method comprising:
obtaining a baseline set of graph information associated with a predefined JAVASCRIPT execution environment of a web browser, the baseline set indicating a baseline state of the predefined JAVASCRIPT execution environment at a baseline time interval;
obtaining a second set of graph information associated with the predefined JAVASCRIPT execution environment, the second set indicating a second state of the predefined JAVASCRIPT execution environment at a second time interval that is later in time than the baseline time interval;
initiating storage of the baseline set of graph information in a private storage location that is privately available to the predefined JAVASCRIPT execution environment; and
detecting virtualization activity associated with a dynamic runtime by comparing the baseline set and the second set.

13. The method of claim 12, wherein:
the second set of graph information is obtained via a first non-virtualizable function invoked by the web browser, the first non-virtualizable function defined by the predefined JAVASCRIPT execution environment.

14. The method of claim 12, further comprising:
initiating a validation of current output of at least one function that is defined by the predefined JAVASCRIPT execution environment, wherein
the baseline set of graph information is obtained via invocation of the at least one function after validation of output, wherein
the second set of graph information is obtained via invocation of the at least one function after validation of output.

15. A computer program product comprising a hardware computer-readable storage medium storing executable code that, when executed, causes at least one data processing apparatus to:
obtain a baseline set of state information associated with predefined execution environment objects that are included in a predefined execution environment of a program, at least a portion of the predefined execution environment objects being dynamically mutatable, the baseline set of state information indicating a baseline state of the predefined execution environment at a baseline time interval;
obtain a second set of state information associated with the predefined execution environment objects, the second set of state information indicating a second state of the predefined execution environment at a second time interval that is later in time than the baseline time interval;
initiate storage of the baseline set of state information in a private storage location that is privately available to the predefined execution environment; and
initiate a comparison of the baseline set of state information and the second set of state information to determine virtualization activity associated with a dynamic runtime.

16. The computer program product of claim 15, wherein the executable code, when executed, causes the at least one data processing apparatus to:
obtain the baseline set of state information based on obtaining a baseline set of graph information associated with the predefined execution environment of the program, wherein a graph associated with the baseline set of graph information is induced based on graph nodes representing the predefined execution environment objects and graph edges representing the relationships between the predefined execution environment objects, and
obtain the second set of state information based on obtaining a second set of graph information associated with the predefined execution environment of the program, wherein a graph associated with the second set of graph information is induced based on the graph nodes representing the predefined execution environment objects and the graph edges representing the relationships between the predefined execution environment objects, at the second time interval.

17. The computer program product of claim 16, wherein:
the baseline set of graph information includes baseline state information associated with the predefined execution environment objects and relationships between the predefined execution environment objects, at the baseline time interval, wherein a graph associated with the baseline set of graph information is induced based on graph nodes representing the predefined execution environment objects and graph edges representing the relationships between the predefined execution environment objects, and
the second set of graph information includes second state information associated with the predefined execution environment objects and the relationships between the predefined execution environment objects, at the second time interval.

18. The computer program product of claim 16, wherein the executable code, when executed, causes the at least one data processing apparatus to:
obtain the second set of state information via invocation of a first non-virtualizable function, wherein the first non-virtualizable function is defined by the predefined execution environment;
obtain the baseline set of graph information based on recursively first traversing nodes representing predefined execution environment objects that are reachable via references from global variables in the predefined execution environment, at the baseline time interval, and storing values associated with first traversal visited nodes in a first list, and
obtain the second set of graph information based on recursively second traversing the nodes representing the predefined execution environment objects that are reachable via references from global variables in the predefined execution environment, at the second time interval, and storing values associated with second traversal visited nodes in a second list.

19. The computer program product of claim 18, wherein the executable code, when executed, causes the at least one data processing apparatus to:
initiate the comparison of the baseline set of state information and the second set of state information based on one or more of:
comparing a size of the first list with a size of the second list, or
comparing a value of each element of the first list to a value of a corresponding element of the second list.

20. The computer program product of claim 15, wherein the executable code, when executed, causes the at least one data processing apparatus to:
initiate a validation of current output of at least one function that is defined by the predefined execution environment, wherein the baseline set of graph information is obtained via invocation of the at least one function after validation of output, wherein
the second set of graph information is obtained via invocation of the at least one function after validation of output.

\* \* \* \* \*